Oct. 30, 1962   J. L. HAMP   3,060,617
FISHING ROD
Filed Oct. 13, 1960

INVENTOR.
JOHN L. HAMP
BY
ATTORNEYS

United States Patent Office 3,060,617
Patented Oct. 30, 1962

3,060,617
FISHING ROD
John L. Hamp, 3015 Holly St., Denver 7, Colo.
Filed Oct. 13, 1960, Ser. No. 62,203
1 Claim. (Cl. 43—18)

This invention relates to sporting equipment and more particularly to an extensible fishing rod of a variable length for use as either a long, fly fishing rod or a shorter, spinning-type rod.

Fishing rods of intermediate length, on the order of six to seven feet, are commonly referred to by sporting goods dealers, and particularly manufacturers, as dual purpose rods. That is, the manufacturer and the sporting goods dealer attempt to sell such rods as either fly rods or spinning rods. It is generally conceded, however, that the best action for a spinning tackle is obtained with a rod of between six and one-half and seven feet. Such rods are relatively stiff so that various weights of lures, on the order of one-eighth to one ounce lures, may be used, depending on the type of fishing desired. Such rods are not too satisfactory for flyline rods. Normally, a flyline rod should be quite long and very flexible for casting the line on which is placed a fly or lure of negligible weight. In using spinning equipment, the lure itself is flipped to the desired spot and the lure itself draws or pulls the line from the reel. With a fly fishing rod, on the other hand, the fishing line is manually pulled from the reel, and the rod itself is used to cast the already extended line. Thus, with the spinning equipment, the line is retrieved from each cast, whereas with a fly rod, the line is not retrieved, but is literally whipped around by the rod.

Since these two types of fishing are different they require completely different action of both the rod and the line. Thus so-called dual purpose fishing rods are effectively limited to only one type gear. Additionally, the known rods are made with a particular flexibleness or whip and there is no way to change this.

According to the present invention, I have provided a true, dual purpose fishing rod in which the length of the rod may be adjusted to change the flexure of the rod, its length and thereby change its characteristics to suit the particular type of fishing desired. The rod of the invention is provided with an elongated handle and a rod section which is arranged to variably telescope into the handle varying the effective length of the rod. Means are provided for securing the rod in position in the handle for use.

Included among the objects and advantages of the present invention is a fishing pole or rod of variable length, which is arranged with a handle portion into which the rod may partially telescope to vary the effective length of the rod and thereby vary the flexure of the rod. Means are provided for releasably securing the rod in position in the handle to provide a rod which has an adjustable flexibility according to the desires of the user. The invention includes a dual purpose rod which is arranged as a long, highly flexible fly fishing rod to a relatively short, stiffer spinning gear fishing rod.

These and other objects and advantages of the invention may be readily ascertained by referring to the following description and appended illustrations in which.

Figure 4:
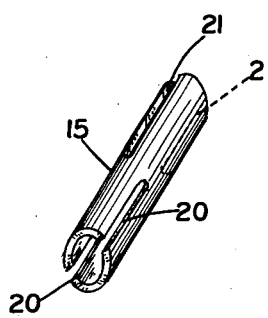
FIG. 4 is a perspective view of a rod clamping portion according to the invention.

In the device illustrated, the handle portion of a fishing rod includes a rigid tubular member 1 having a surrounding handle member 2 of cork or other suitable material for a grip for the rod. The handle member includes at one end a flared portion 3 and a cover portion 4 at its opposite end for retaining a movable reel holder or clamp 5 on the handle. The handle material portion 2 of the device is preferably of a uniform external diameter throughout a major length, whereby the reel holder may be placed at substantially any position along its length. The reel seat or holder includes a reel holding notch 6 at one side which communicates with a raised portion 7 at one end for placing a reel holding bracket end thereunder. A clamp ring 8 threadedly engages the threaded upper portion 9 of the reel seat so as to clamp the reel holding bracket into the raised portion 7 and securely hold a reel on the handle. Such reel seats are commonly used with rod handles of some length so that the fisherman may place the reel at any convenient position for the type of fishing desired.

The tubular member 1 has a flanged collar 10 secured thereto with its flange 11 abutting the upper end of the handle material for securing the same on the tubular member. A chuck cap 12 threadedly engages the threaded outer end 13 of the collar. A partially split bushing or collet 15, shown in detail in FIG. 4, is arranged to ring a portion of a rod 16 and extend into the collar 10. The collar 10 includes an internal sloped shoulder 18 against which the split collet 15 seats for squeezing on the rod and prevents it from further internal movement. The chuck cap 12 includes an inwardly tapered outlet 19 which is arranged to seat against the split collet and squeeze it against the rod 16 securely holding the same.

The collet in a preferred form is a tubular member having a pair of slits 20 at one end extending approximately half way through the tubular member and these splits are positioned 180° opposite each other. At the opposite end is another pair of slits 21, likewise positioned 180° apart, but at 90° to the slits 20 at the opposite end. All the slits extend approximately to the middle of the collet. The ends of the collet are preferably tapered to seat against the tapered shoulder 18 and the tapered outlet 19 so that both ends of the collet are squeezed against the rod for securely fastening the same in the handle.

In a preferred form as illustrated, the rod comprises two sections, the first or larger diameter section 16 telescopes internally of the handle and is arranged to be secured in place by the chuck. This section is preferably of substantially uniform diameter for the portion to telescope in the handle. The second or tip section 30 includes mounted guides 31 and 32 and a guide tip 33, as in common practice. The rods are interconnected by means of a more or less conventional connection 34 in which the upper rod 30 merely telescopes in the ferrule of the lower section.

Figures 2, 3:
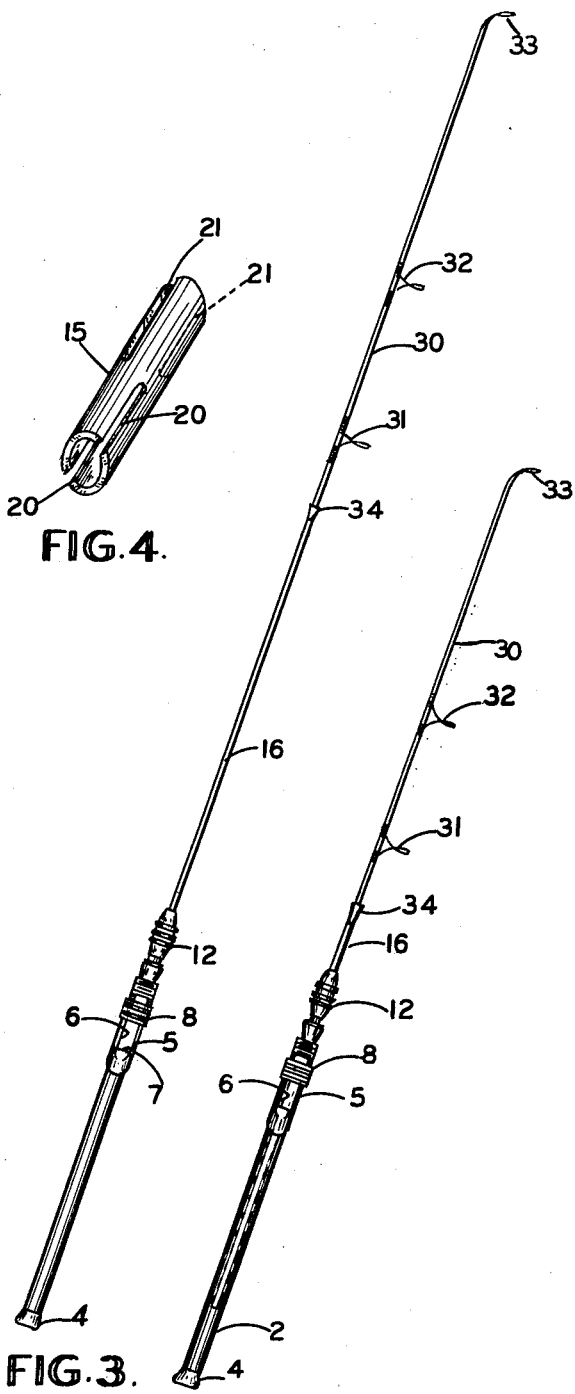
FIG. 2 is an elevational view of a form of the invention with the rod section telescoped in the handle forming a relatively stiff fishing rod.
FIG. 3 is an elevation of a rod in fully extended position for maximum flexure of the rod.
Figure 1:
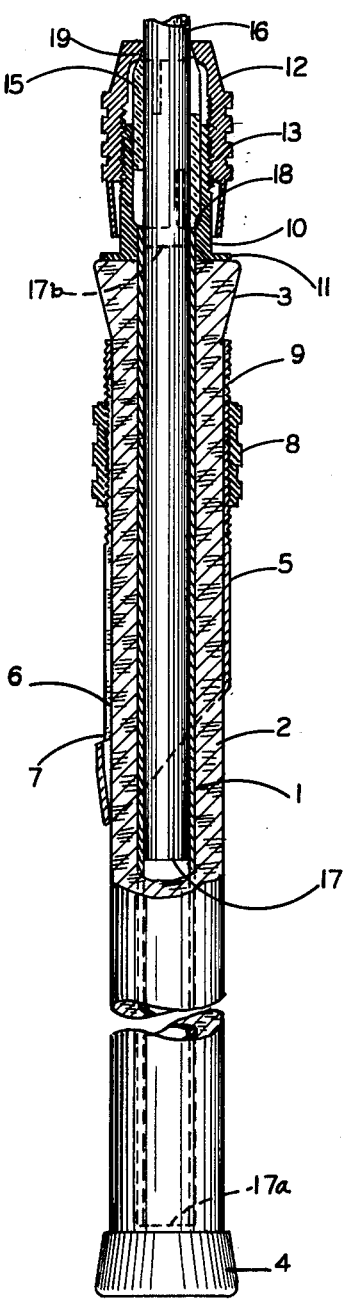
FIG. 1 is a partial, sectional view of a handle portion of a fishing rod according to the invention.

As illustrated in FIG. 2, the fishing rod of the invention is in fully retracted position, that is, with the rod part 16 fully retracted internally of the handle 16 with the end 17 at position 17a, FIG. 1. With the collet pulled down tight, the rod is releasably secured in the handle. In this position the rod has its minimum flexure, since the effective length of the rod is minimum. The effective length of the rod is determined by the length of the rod from the chuck to its tip.

The tubular member 1, as pointed out above, is rigid and it holds the rod portion internally thereof rigid and substantially without flexure. In this configuration, the rod provides excellent spinning characteristics with sufficient stiffness to utilize the heaviest lures. It is, of course, obvious that the rod could be extended short distances from its fully retracted position to provide a change in flexure of the rod for use. Thus, with lighter spinning equipment, it may be desirable to slightly extend the rod 16 to increase its effective length and thereby increase the flexibility of the rod.

In the configuration of FIG. 3, the device is shown fully extended with the rod portion 16 extended to its fullest extent and still be secured within the chuck on the handle. In this instance, the end 17 of the rod is in position 17b. At this maximum extension it is still securely held by the chuck. Also, in this configuration, the maximum flexibility of the rod is accomplished, and it provides the characteristics of a fly rod.

By properly adjusting the length of the handle and the length of the individual rod parts 16 and 30, it is possible to achieve a fly rod of a length which approaches a long fly rod and a short spinning rod. With a relatively large length spread, it is possible to utilize the rod at substantially any flexure desired for any type of fishing between fly fishing and spinning with heavy lures. With a handle having a passage therethrough and no cover on one end, the rod may be considerably shortened by permitting the end of the rod to extend through.

While the invention has been illustrated with reference to a specific device, there is obviously no intent to limit the spirit and scope of the invention to the precise details so set forth except insofar as defined in the following claim.

I claim:

A fishing rod of the class described comprising a tubular handle member of substantial length having a tubular passage of uniform diameter extending therethrough and having an opening in one end, a threaded collar encircling said opening and secured to said handle member, a fixed length rod member, one end portion of said rod member being of a length at least as long as the length of said passage in the handle and of substantially uniform diameter, said one end portion of said rod member being telescoped with a close fit in the passage of said handle, chuck means mounted on said threaded collar, said chuck means including a separable, double split collet encompassing the opening in said handle and a chuck cap mounted over said split collet that threadedly engaged with said collar, said chuck cap including an internal sloped shoulder and said threaded collar including an internal sloped shoulder against which said double split collet seats whereby when said chuck cap is pulled down against said collet said collet squeezes said rod at two spaced positions to securely hold it in a predetermined position and the rod portion internally of the handle is held rigid and substantially without flexure, reel seat means reciprocally disposed on said handle for securing a line holding reel thereon, said reel seat means including a tubular member reciprocally mounted on said handle, and a reel holding notch and threaded clamp ring for securing a reel on said handle in a predetermined position along the length thereof.

References Cited in the file of this patent

UNITED STATES PATENTS

| D. 156,615 | Fletcher | Dec. 27, 1949 |
| 828,557 | Levison | Aug. 14, 1906 |
| 1,731,173 | Pope | Oct. 8, 1929 |
| 1,914,500 | Groschup | June 20, 1933 |
| 2,597,738 | Koos | May 20, 1952 |
| 2,702,192 | Warth | Feb. 15, 1955 |
| 2,808,676 | Major | Oct. 8, 1957 |

FOREIGN PATENTS

| 1,009,949 | France | Mar. 12, 1952 |
| 1,055,369 | France | Oct. 14, 1953 |
| 839,582 | Great Britain | June 29, 1960 |